US011455201B2

(12) United States Patent
Kim et al.

(10) Patent No.: US 11,455,201 B2
(45) Date of Patent: Sep. 27, 2022

(54) METHOD AND SYSTEM FOR DATA TRANSMISSION AND RECEPTION OF DISPLAY DEVICE

(71) Applicant: SILICON WORKS CO., LTD., Daejeon (KR)

(72) Inventors: Do Seok Kim, Daejeon (KR); Yong Hwan Mun, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/353,723

(22) Filed: Jun. 21, 2021

(65) Prior Publication Data

US 2021/0406108 A1 Dec. 30, 2021

(30) Foreign Application Priority Data

Jun. 25, 2020 (KR) ........................ 10-2020-0077708

(51) Int. Cl.
*G06F 11/00* (2006.01)
*G06F 11/07* (2006.01)
*G06F 11/10* (2006.01)
*G06F 11/30* (2006.01)

(52) U.S. Cl.
CPC ........ *G06F 11/0745* (2013.01); *G06F 11/079* (2013.01); *G06F 11/0772* (2013.01); *G06F 11/1004* (2013.01); *G06F 11/3041* (2013.01)

(58) Field of Classification Search
CPC ............. G06F 11/0745; G06F 11/0772; G06F 11/079; G06F 11/1004; G06F 11/3041; G06G 2310/08; G06G 2310/027; G06G 2310/0275; G06G 2310/0278; G09G 3/2092; G09G 3/2096
See application file for complete search history.

(56) References Cited

U.S. PATENT DOCUMENTS

| | | | |
|---|---|---|---|
| 8,654,155 B2 | 2/2014 | Yu et al. | |
| 9,436,562 B1* | 9/2016 | Klein | .................. G06F 11/1625 |
| 10,163,386 B2 | 12/2018 | Lee et al. | |
| 2009/0172224 A1* | 7/2009 | Suh | ........................ H04L 1/007 714/758 |
| 2010/0020111 A1 | 1/2010 | Yu et al. | |
| 2017/0069257 A1 | 3/2017 | Lee et al. | |
| 2018/0114479 A1* | 4/2018 | Han | ..................... G09G 3/3696 |

FOREIGN PATENT DOCUMENTS

| | | |
|---|---|---|
| KR | 10-1351405 B1 | 1/2014 |
| KR | 10-2017-0029711 A | 3/2017 |

* cited by examiner

*Primary Examiner* — Michael Maskulinski
(74) *Attorney, Agent, or Firm* — Fenwick & West LLP

(57) ABSTRACT

The present embodiment relates to a method and a system for data transmission and reception of a display device and, more specifically, to a method and a system for repeatedly checking whether an error has occurred in a data driving device configuration for high-speed communication when driving the display device to prevent the image quality degradation due to the configuration error.

18 Claims, 11 Drawing Sheets

METHOD AND SYSTEM FOR DATA TRANSMISSION AND RECEPTION OF DISPLAY DEVICE

CROSS REFERENCE TO RELATED APPLICATION

This application claims priority from Republic of Korea Patent Application No. 10-2020-0077708, filed on Jun. 25, 2020, which is hereby incorporated by reference in its entirety.

BACKGROUND

1. Field of Technology

The present embodiment relates to a method and a system for data transmission and reception of a display device.

2. Description of the Prior Art

A display panel includes multiple pixels disposed in a form of a matrix, and each pixel includes subpixels of red (R), green (G), and blue (B), for example. Each subpixel emits light in a greyscale according to image data such that the display panel displays an image.

The image data is transmitted from a data processing device referred to as a timing controller to a data driving device referred to as a source driver. The image data is transmitted as a digital value, and the data driving device converts the image data into an analog voltage, thereby driving each subpixel.

The image data indicates the greyscale value of each pixel individually or independently. As a result, the amount of image data increases in proportion to the number of pixels disposed on the display panel. In addition, the amount of image data to be transmitted per unit time increases in proportion to the frame rate.

Recently, display panels tend to have higher resolutions. As a result, both the number of pixels disposed on display panels and the frame rate are on the increase. In addition, in order to process the increased amount of image data due to higher resolutions, data communication by display devices are becoming faster.

Meanwhile, during initial driving of the data processing device and the data driving device, that is, immediately after power is applied to the display device, a high-speed environment for high-speed communication between the data processing device and the data driving device needs to be configured.

If the configuration regarding the high-speed communication environment is processed through high-speed communication, errors may occur due to fast operations. Therefore, the configuration regarding the high-speed communication environment is processed through low-speed communication that has a lower clock frequency than the high-speed communication.

The data driving device performs low-speed communication with the data processing device as described above, that is, processes the configuration regarding the high-speed communication environment, and then synchronizes the communication clock through clock training.

After clock training is completed as described above, the data processing device may transmit image data to the data driving device through high-speed communication such that the data driving device outputs an image to the display panel. In other words, the display device may operate normally.

Meanwhile, if noise (for example, static elasticity) occurs inside the display device while the same operates, errors may occur to the high-speed communication with environment of the data driving device configured in advance.

In other words, configuration values of the high-speed communication environment preconfigured by the data driving device may be changed by noise (for example, static elasticity).

If such an error abnormally changes the configuration of the high-speed communication environment, the image quality of the display device may be degraded.

SUMMARY OF THE INVENTION

In view of the above-mentioned background, it is an aspect of the present embodiment to provide a technology for repeatedly checking whether an error has occurred in the configuration of a data driving device regarding high-speed communication when a display device is driven, thereby preventing image quality degradation due to configuration errors.

An embodiment provides a method for data transmission and reception of a data driving device in a display device, the method comprising: a low-speed communication operation of performing low-speed communication with a data processing device to receive configuration value data about a high-speed communication environment and error detection information regarding the configuration value data; a high-speed communication environment configuration operation of configuring the high-speed communication environment by using the configuration value data and of storing the error detection information; an image data reception operation of receiving image data from the data processing device through the high-speed communication; and a determination operation of receiving the error detection information again through the high-speed communication and comparing the error detection information received through the low-speed communication with the error detection information received through the high-speed communication to determine whether an error has occurred in the preconfigured high-speed communication environment.

In the determination operation, when the error detection information received through the low-speed communication does not match the error detection information received through the high-speed communication, the data driving device may determine that an error has occurred in the preconfigured high-speed communication environment.

In the determination operation, the data driving device may receive the image data by frame, receive the error detection information in a vertical blank interval, which is present between one frame interval and another frame interval, and compare this error detection information with the error detection information through the low-speed communication.

In the determination operation, the data driving device, receiving the image data by frame, which is divided into multiple time intervals, may receive the error detection information again in every time interval and compare this error detection information with the error detection information received through the low-speed communication.

One of the multiple time intervals may be divided into a configuration data interval, an image data interval, and a horizontal blank interval, and the data driving device may receive the error detection information again in the horizontal blank interval.

The method may further comprise, after the determination operation, an operation of performing again the low-speed communication with the data processing device to newly receive configuration value data in order to reconfigure the high-speed communication environment.

The configuration value data may include a frequency bandwidth of the high-speed communication and a gain level of an equalizer comprised in the data driving device.

The error detection information may comprise a checksum of the configuration value data.

Another embodiment provides a method for data transmission and reception of a data processing device in a display device, the method including: a low-speed communication operation of performing low-speed communication with a data driving device to transmit configuration value data about an environment of high-speed communication with the data driving device and error detection information of the configuration value data; a first transmission operation of transmitting image data to the data driving device through the high-speed communication when the data driving device completes a clock training for the high-speed communication; and a second transmission operation of transmitting the error detection information to the data driving device through the high-speed communication.

In the second transmission operation, the data processing device may receive a first state signal from the data driving device.

The method may further comprising, after the second transmission operation, an operation of retransmitting configuration value data to the data driving device through the low-speed communication when a second state signal different from the first state signal is received from the data driving device.

The error detection information may include a checksum of the configuration value data.

In the second transmission operation, the data processing device, which may transmit the image data by frame, may transmit image data for one frame, subsequently transmit the error detection information, and transmit image data for another frame.

When the transmission of image data for the one frame is completed, the data processing device may transmit a clock pattern to the data driving device and subsequently transmit the error detection information.

Another embodiment provides a system for data transmission and reception of a display device, the system comprising: a data processing device configured to transmit configuration value data about a high-speed communication environment and error detection information of the configuration value data through low-speed communication, to transmit image data through high-speed communication, and to retransmit the error detection information through the high-speed communication; and a data driving device configured to receive the configuration value data and the error detection information through low-speed communication with the data processing device, to configure the high-speed communication environment by using the configuration value data, to store the error detection information, to receive the image data through high-speed communication with the data processing device, to receive the error detection information again through the high-speed communication, to compare the error detection information received through the high-speed communication with the error detection information received through the low-speed communication, and, when the error detection information received through the high-speed communication does not match the error detection information received through the low-speed communication, to determine that an error has occurred in the preconfigured high-speed communication environment.

The data driving device may be configured, before receiving the image data, to generate a first state signal and to transmit the first state signal to the data processing device, when it is determined that an error has occurred in the predetermined high-speed communication environment, to transmit a second state signal, which is different from the first state signal, to the data processing device and subsequently to receive configuration value data and the error detection information again through low-speed communication with the data processing device.

The system may further comprise: a main line configured to transfer the configuration value data, the error detection information, and the image data from the data processing device to the data driving device; and an auxiliary line configured to transfer the first state signal and the second state signal from the data driving device to the data processing device.

The error detection information may comprise a checksum of the configuration value data.

The disclosure is advantageous as follows:

As described above, according to the present embodiment, the data driving device repeatedly receives, from the data processing device, information that enables the same to confirm whether or not an error regarding the high-speed communication environment occurs when the display device is driven, and accordingly determines whether or not errors occur. Therefore, even if a configuration error occurs to the data driving device due to static elasticity or the like when the display device is driven, the error can be instantly restored, thereby preventing image quality degradation.

DETAILED DESCRIPTION OF THE EXEMPLARY EMBODIMENTS

Figure 1:
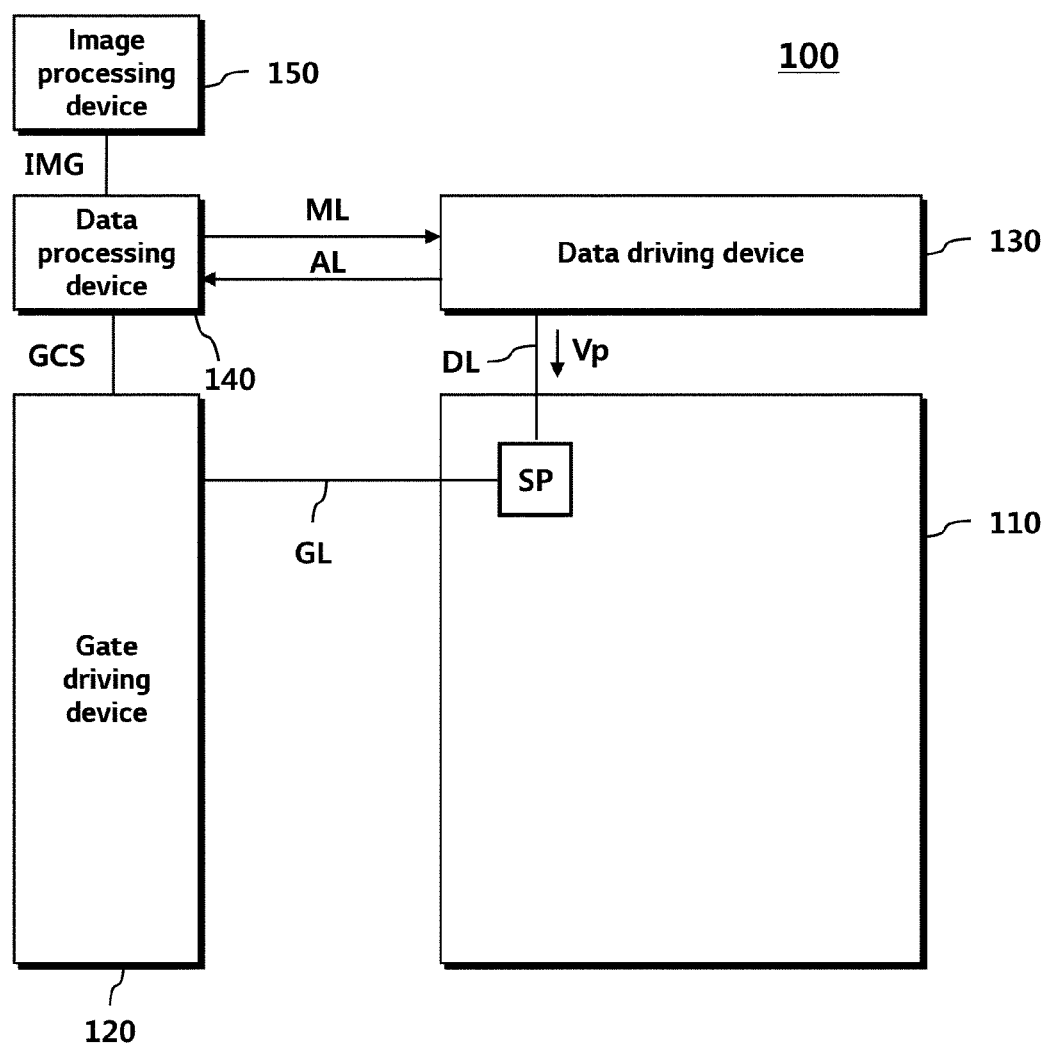
FIG. 1 illustrates the configuration of a display device according to an embodiment.

Hereinafter, some embodiments of the present disclosure will be described in detail with reference to the accompanying drawings. In adding reference numerals to elements in each drawing, the same elements will be denoted by the same reference numerals, if possible, although they are shown in different drawings. Further, in the following description of the present disclosure, a detailed description of known functions or configurations incorporated herein will be omitted when it is determined that the description may make the subject matter of the present disclosure unclear.

In addition, terms, such as first, second, A, B, (a), (b) or the like may be used when describing elements of the present disclosure. These terms are merely used to distinguish one element from other elements, and a property, an order, a sequence and the like of a corresponding element are not limited by the terms. It should be noted that if it is described in the specification that one element (a first element) is "connected," "coupled" or "joined" to another element (a second element), a third element may be "connected," "coupled," and "joined" between the first and second elements, although the first elements may be directly connected, coupled or joined to the second element.

FIG. 1 illustrates the configuration of a display device according to an embodiment.

Referring to FIG. 1, a display device 100 may include a display panel 110, a gate driving device 120, a data driving device 130, a data processing device 140, or the like.

Multiple data lines (DLs), multiple gate lines (GLs), and multiple pixels may be disposed in the display panel 110. Each of the pixels includes multiple sub-pixels (SPs). Herein, a sub-pixel may be red (R), green (G), blue (B), white (W), etc. One pixel may include sub-pixels (SPs) of RGB, may include sub-pixels (SPs) of RGBG, or may include sub-pixels (SPs) of RGBW.

The gate driving device 120, the data driving device 130, and the data processing device 140 are devices configured to generate signals for displaying an image on the display panel 110.

The gate driving device 120 may supply a gate driving signal of a turn-on voltage or a turn-off voltage through a gate line (GL). When a gate driving signal of a turn-on voltage is supplied to a sub-pixel (SP), the sub-pixel (SP) is connected to a data line (DL). When a gate driving signal of a turn-off voltage is supplied to the sub-pixel (SP), the sub-pixel (SP) is disconnected from the data line (DL). The gate driving device 120 may be called a gate driver.

The data driving device 130 may supply a data voltage (Vp) to a sub-pixel (SP) through a data line (DL). The data voltage (Vp) supplied through the data line (DL) may be supplied to the sub-pixel (SP) according to a gate driving signal. The data driving device 130 may be called a source driver.

The data driving device 130 may include at least one integrated circuit. The at least one integrated circuit may be connected to a bonding pad of the panel 110 in a tape automated bonding (TAB) method or a chip-on-glass (COG) method, or may be directly formed in the panel 110. According to an embodiment, the at least one integrated circuit may be integrated with the panel 110. Further, the data driving device 130 may be implemented in a chip-on-film (COF) method.

In an embodiment, when a driving voltage (VCC) is applied to the data driving device 130 and the data processing device 140, the data driving device 130 may perform low-speed communication with the data processing device 140 in order to configure a high-speed communication environment which is a communication environment for high-speed communication with the data processing device 140. Herein, the high-speed communication may be communication having a clock frequency of several Giga bps, and the low-speed communication may be communication having a lower clock frequency (e.g., a clock frequency of several Mega bps) than the high-speed communication.

The data driving device 130 may receive configuration value data about the high-speed communication environment and error detection information of the configuration value data from the data processing device 140 through low-speed communication. Herein, the data driving device 130 may receive the configuration value data and the error detection information in a CFG Data interval in FIG. 4. In an embodiment, the error detection information may include a checksum of the configuration value data, and the configuration value data may include the frequency bandwidth of high-speed communication, a gain level of an equalizer included in the data driving device 130, etc.

The data driving device 130 may receive a clock pattern for low-speed communication from the data processing device 140 in a Preamble interval preceding the CFG Data interval to perform clock training for the low-speed communication. Herein, the data driving device 130 may receive the configuration value data, the error detection information, and the clock pattern for low-speed communication through a main line (ML). Further, the clock training may be the process of synchronizing the inner clock of the data driving device 130 with a communication clock.

When the clock training for low-speed communication has been completed normally, the data driving device 130 may output a first state signal, which is a signal indicating that a communication state is stable, and may transmit the first state signal to the data processing device 140. The first state signal may be called a high-level (high-voltage-level) lock signal, and may be transmitted through an auxiliary line (AL).

The data driving device 130 may use the configuration value data to configure a high-speed communication environment, and may store the error detection information. Herein, the data driving device 130 may store the error detection information in a memory circuit (not shown) included in the device. The memory circuit (not shown) of the data driving device 130 may include at least one of a register and random access memory (RAM).

Figure 4:
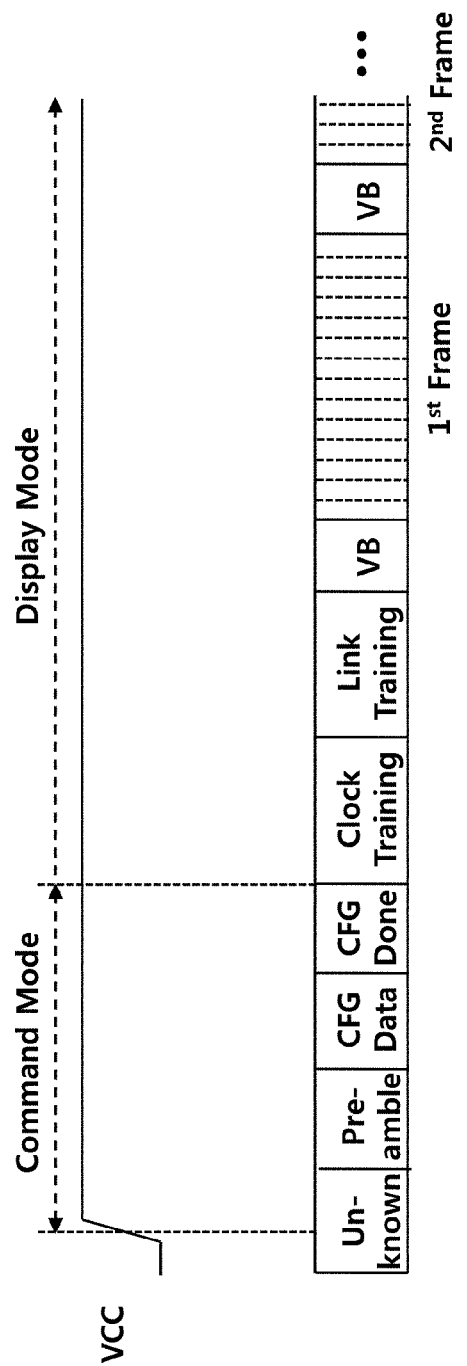
FIG. 4 illustrates a data transmission/reception sequence of a main line according to an embodiment.

After the high-speed communication environment is configured by performing the low-speed communication with the data processing device 140 as described above, the data driving device 130 may receive, in a Clock Training interval in FIG. 4, a clock pattern for high-speed communication with the data processing device 140 from the data processing device 140 to perform clock training for the high-speed communication. Herein, the data driving device 130 may continuously transmit the first state signal to the data processing device 140 through the auxiliary line (AL). In other words, the data driving device 130 may continuously transmit the first state signal after the clock training for the low-speed communication is completed normally.

After the clock training for the high-speed communication is performed as described above, the data driving device 130 may receive image data from the data processing device 140 through the high-speed communication and process the received image data.

In other words, the data driving device 130 may generate a data voltage (Vp) on the basis of the image data, and may supply the same to a sub-pixel (SP).

During reception and processing of the image data, the data driving device 130 may receive error detection information from the data processing device 140. Herein, the data driving device 130 may receive the error detection information through the high-speed communication.

The data driving device 130 may compare the error detection information received through the high-speed communication with the error detection information pre-stored during the low-speed communication to determine whether two pieces of information match each other.

If noise such as static electricity is generated in the display device 100 when the data processing device 140 and the data driving device 130 perform high-speed communication, an error may occur in the high-speed communication environment preconfigured in the data driving device 130.

In other words, configuration values for the high-speed communication environment preconfigured in the data driving device 130 may be changed due to noise such as static electricity.

In this case, the error detection information pre-stored in the data driving device 130 may also be changed.

Therefore, if the error detection information received through the high-speed communication does not match the pre-stored error detection information, the data driving device 130 may determine that an error has occurred in the high-speed communication environment. In this case, the data driving device 130 may output a second state signal that is different from the first state signal, and may transmit the second state signal to the data processing device 140. Herein, the second state signal may be called a low-level (low-voltage-level) lock signal.

After transmitting the second state signal, the data driving device 130 may perform low-speed communication with the data processing device 140 again to receive the configuration value data again. The data driving device 130 may reconfigure the high-speed communication environment by using the configuration value data.

Herein, the data driving device 130 may also receive the error detection information from the data processing device 140 again, and may store the same.

If the error detection information received through the high-speed communication matches the previously stored error detection information, the data driving device 130 may continuously transmit the first state signal to the data processing device 140. The above-described process may repeatedly be performed by receiving the image data from the data processing device 140 and receiving the error detection information while the image data is received.

In an embodiment, the data driving device 130 may receive, as illustrated in FIG. 4, image data in frame interval units, and may receive error detection information in a vertical blank interval (VB) that is present between one frame interval and another frame interval. Subsequently, the pre-stored error detection information and the error detection information received in the vertical blank interval (VB) may be compared with each other.

Figure 5:
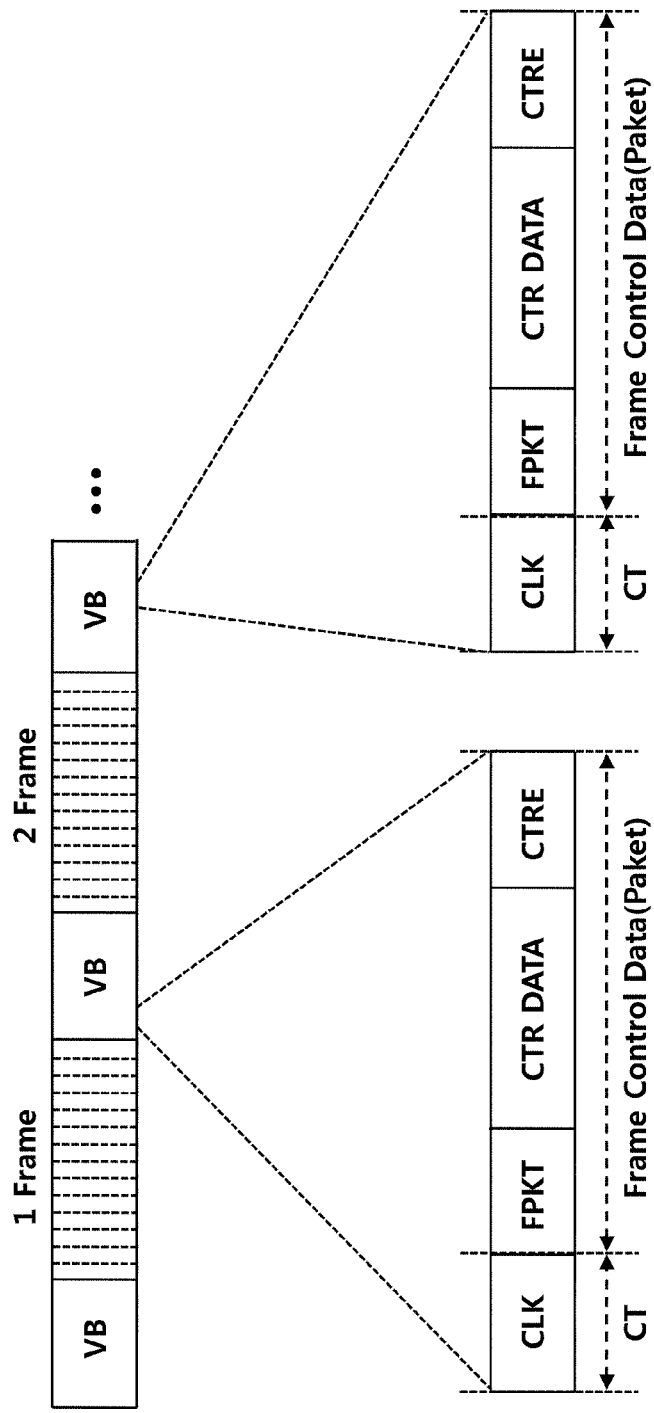
FIG. 5 is a view illustrating a configuration in which error detection information is transmitted and received in a vertical blank interval according to an embodiment.

Herein, as illustrated in FIG. 5, the data driving device 130 may receive, before receiving error detection information in the vertical blank interval (VB), a clock pattern (CLK) for high-speed communication to perform clock training, and may then receive the error detection information. When the data driving device 130 receives the error detection information in the vertical blank interval (VB), the error detection information may be included in packet-type frame control data, as illustrated in FIG. 5, and the data driving device 130 may extract the error detection information from the frame control data.

Further, the error detection information may be included in the frame control data for each vertical blank interval (VB).

Figure 6:
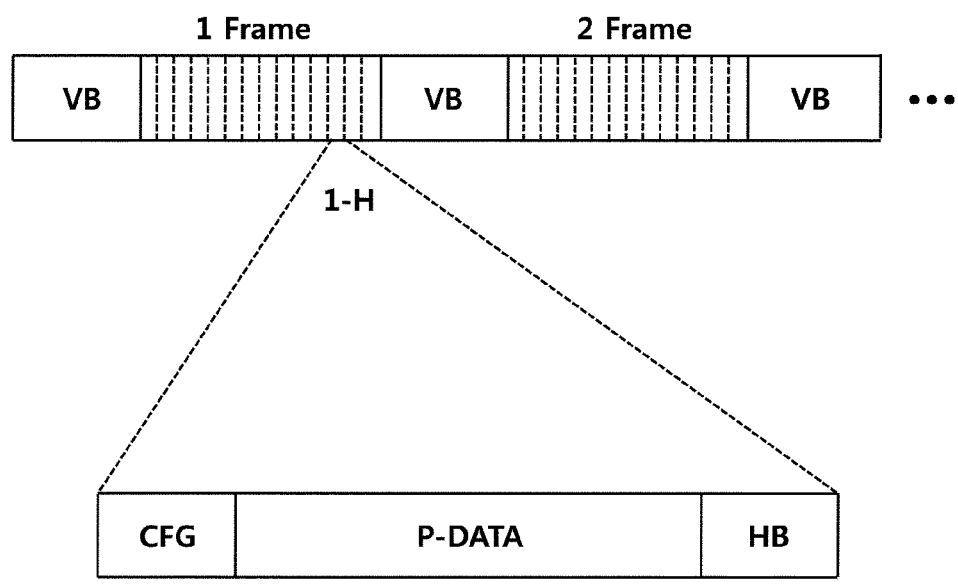
FIGS. 6 and 7 are views illustrating a configuration in which error detection information is transmitted and received in a horizontal blank interval according to an embodiment.

In an embodiment, as illustrated in FIG. 6, in one frame interval divided into multiple time intervals, the data driving device 130 may also receive error detection information in each of the multiple time intervals. In this case, in each time interval, the data driving device 130 may compare the pre-stored error detection information with error detection information received in one time interval (1-H).

Herein, as illustrated in FIG. 6, the one time interval (1-H) among the multiple time intervals may be divided into a configuration data interval (CFG), an image data interval (P-DATA), and a horizontal blank interval (HB), and the data driving device 130 may receive error detection information in the horizontal blank interval (HB).

Figure 7:
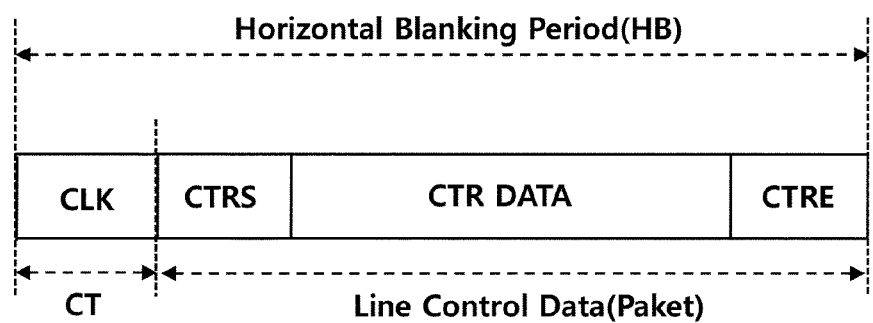

When the data driving device 130 receives error detection information in the horizontal blank interval (HB), the error detection information may be included in packet-type line control data, as illustrated in FIG. 7, and the data driving device 130 may extract the error detection information from the line control data. Herein, the line control data may imply control data about one pixel line in the display panel 110.

As illustrated in FIG. 7, the data driving device 130 may receive, before receiving the error detection information in the horizontal blank interval (HB), a clock pattern (CLK) for high-speed communication to perform clock training.

In an embodiment, the data driving device 130 may receive the configuration value data, the error detection information, the clock pattern, and the image data through the main line (ML) in FIG. 1.

Further, the data driving device 130 may transmit the first state signal or the second state signal to the data processing device 140 through the auxiliary line (AL).

The data processing device 140 may transmit a control signal to the gate driving device 120 and the data driving device 130. For example, the data processing device 140 may transmit a gate control signal (GCS), which causes scanning to start, to the gate driving device 120. Further, the data processing device 140 may output image data to the data driving device 130. Further, the data processing device 140 may transmit a data control signal that controls the data driving device 130 to supply a data voltage (Vp) to each sub-pixel (SP). The data processing device 140 may be called a timing controller.

An image processing device 150 may generate image data (IMG) and may transmit the image data (IMG) to the data processing device 140. The image processing device 150 may be called a host.

In an embodiment, when a driving voltage (VCC) is supplied to the data driving device 130 and the data processing device 140, the data processing device 140 transmits a clock pattern for low-speed communication to the data driving device 130 through the main line (ML) such that the data driving device 130 performs clock training for the low-speed communication.

When the data driving device 130 completes the clock training for the low-speed communication, the data processing device 140 may receive the first state signal through the auxiliary line (AL).

Thus, the data processing device 140 may determine that the data driving device 130 is in a normal state. Subsequently, the data processing device 140 may perform low-speed communication with the data driving device 130 to transmit configuration value data and error detection information to the data driving device 130. Herein, when the error detection information includes a checksum of the configuration value data, the data processing device 140 may sum all bit values of the configuration value data to generate the checksum, and may store the checksum.

After the configuration value data and the error detection information are transmitted, the data processing device 140 transmits a clock pattern for high-speed communication to the data driving device 130 such that the data driving device 130 performs clock training. Herein, the data processing device 140 may transmit the clock pattern to the data driving device 130 through the main line (ML), and may continuously receive the first state signal through the auxiliary line (AL).

The data processing device 140 may determine, through the continuous reception of the first state signal, that the data driving device 130 is in a normal state, and may transmit image data to the data driving device 130 through high-speed communication.

In an embodiment, the data processing device 140 may transmit error detection information to the data driving device 130 while the image data is transmitted.

Herein, as illustrated in FIG. 4, the data processing device 140 may separately transmit the image data in frame interval units and, when transmission of one frame interval is completed, may transmit error detection information in a vertical blank interval (VB) and then transmit another frame interval.

Herein, before transmitting the error detection information in the vertical blank interval (VB), the data processing device 140 may transmit, as illustrated in FIG. 5, a clock pattern (CLK) for high-speed communication to the data driving device 130. As illustrated in FIG. 5, the data processing device 140 may transmit the error detection information to the data driving device 130 in the state in which the error detection information is included in packet-type frame control data.

In an embodiment, as illustrated in FIG. 6, in one frame interval divided into multiple time intervals, the data processing device 140 may also transmit error detection information in a horizontal blank interval of each of the multiple time intervals.

Herein, as illustrated in FIG. 7, the data processing device 140 may transmit the error detection information to the data driving device 130 in the state in which the error detection information is included in packet-type line control data.

After the error detection information is transmitted during the transmission of the image data as described above, when the data driving device 130 transmits the second state signal different from the first state signal through the auxiliary line (AL), the data processing device 140 may receive the second state signal through the auxiliary line (AL). Thus, the data processing device 140 may determine that an error has occurred in a high-speed communication environment configuration of the data driving device 130, and may retransmit the configuration value data to the data driving device 130 through low-speed communication. Herein, the data processing device 140 may also retransmit the error detection information through low-speed communication.

Figure 2:
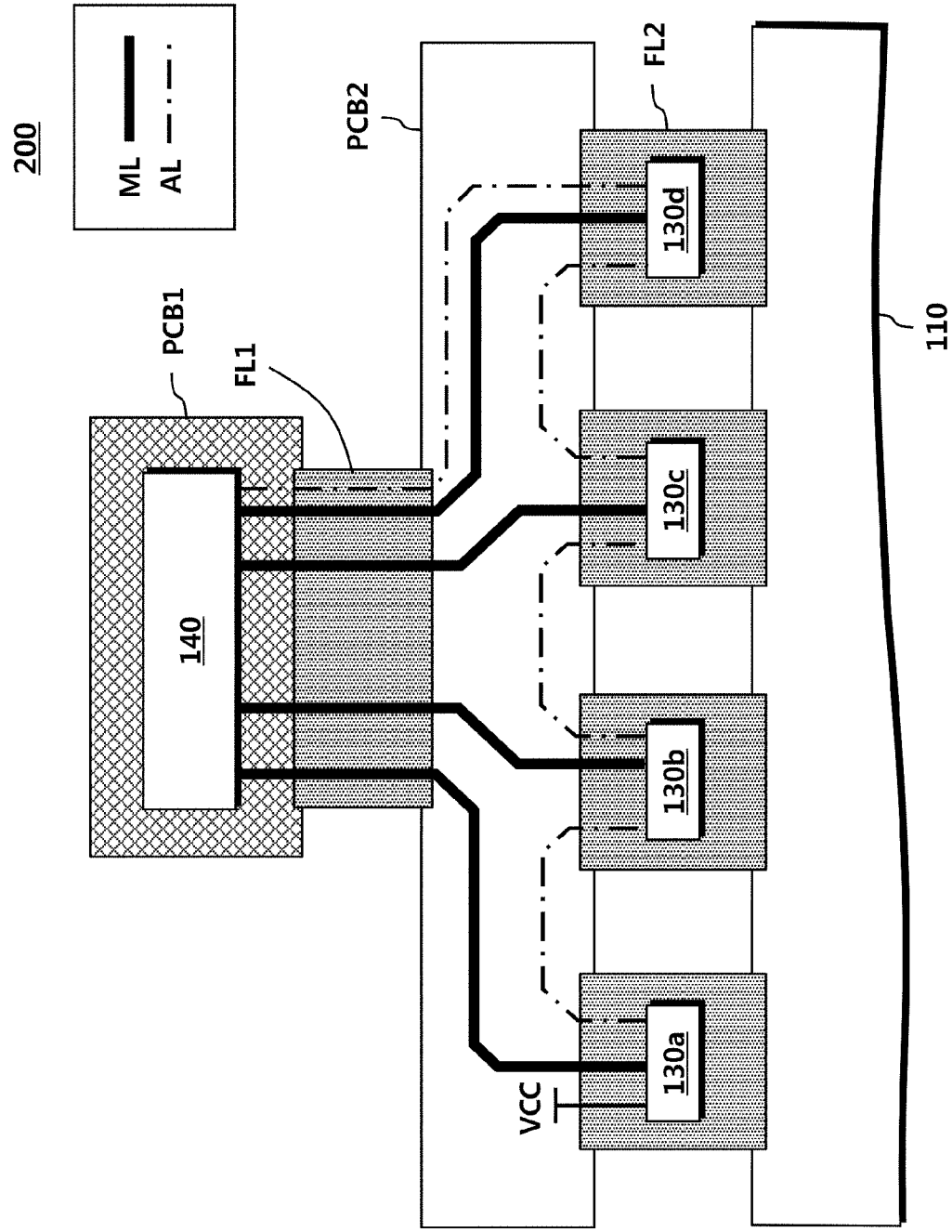
FIG. 2 illustrates the configuration of a data transmission/reception system according to an embodiment.

FIG. 2 illustrates the configuration of a data transmission/reception system according to an embodiment.

Referring to FIG. 2, a data transmission/reception system 200 may include at least one data processing device 140 and multiple data driving devices 130*a*, 130*b*, 130*c*, and 130*d*.

The data processing device 140 may be disposed on a first printed circuit board (PCB1). The data processing device 140 may be connected to the multiple data driving devices 130*a*, 130*b*, 130*c*, and 130*d* through main lines (MLs) and auxiliary lines (ALs).

The main lines (MLs) and the auxiliary lines (ALs) may reach the multiple data driving devices 130*a*, 130*b*, 130*c*, and 130*d* via the first PCB (PCB1) and a second PCB (PCB2).

The first PCB (PCB1) and the second PCB (PCB2) may be connected to each other through a first film (FL1) made of a flexible material, and the main lines (MLs) and auxiliary lines (ALs) may extend from the first PCB (PCB1) to the second PCB (PCB2) via the first film (FL1).

Each of the data driving devices 130*a*, 130*b*, 130*c*, and 130*d* may be disposed on a second film (FL2) in a chip-on-film (COF) method. The second film (FL2) may be a flexible support substrate which connects the second PCB (PCB2) to the display panel 110, and the main lines (MLs) and the auxiliary lines (ALs) may extend from the second PCB (PCB2) to the data driving devices (130*a*, 130*b*, 130*c*, and 130*d*) via the second film (FL2).

The main lines (MLs) may be connected between the data processing device 140 and the data driving devices 130*a*, 130*b*, 130*c*, and 130*d* in a one-to-one fashion.

The auxiliary lines (ALs) may be connected, without planarly overlapping the main lines (MLs), between data driving devices 130*a*, 130*b*, 130*c*, and 130*d* or between the data driving device 130*d* and the data processing device 140. For example, a first data driving device 130*a* may be connected to a second data driving device 130*b* through an auxiliary line (AL), and the second driving device 130*b* may be connected to a third data driving device 130*c* through an auxiliary line (AL).

Figure 3:
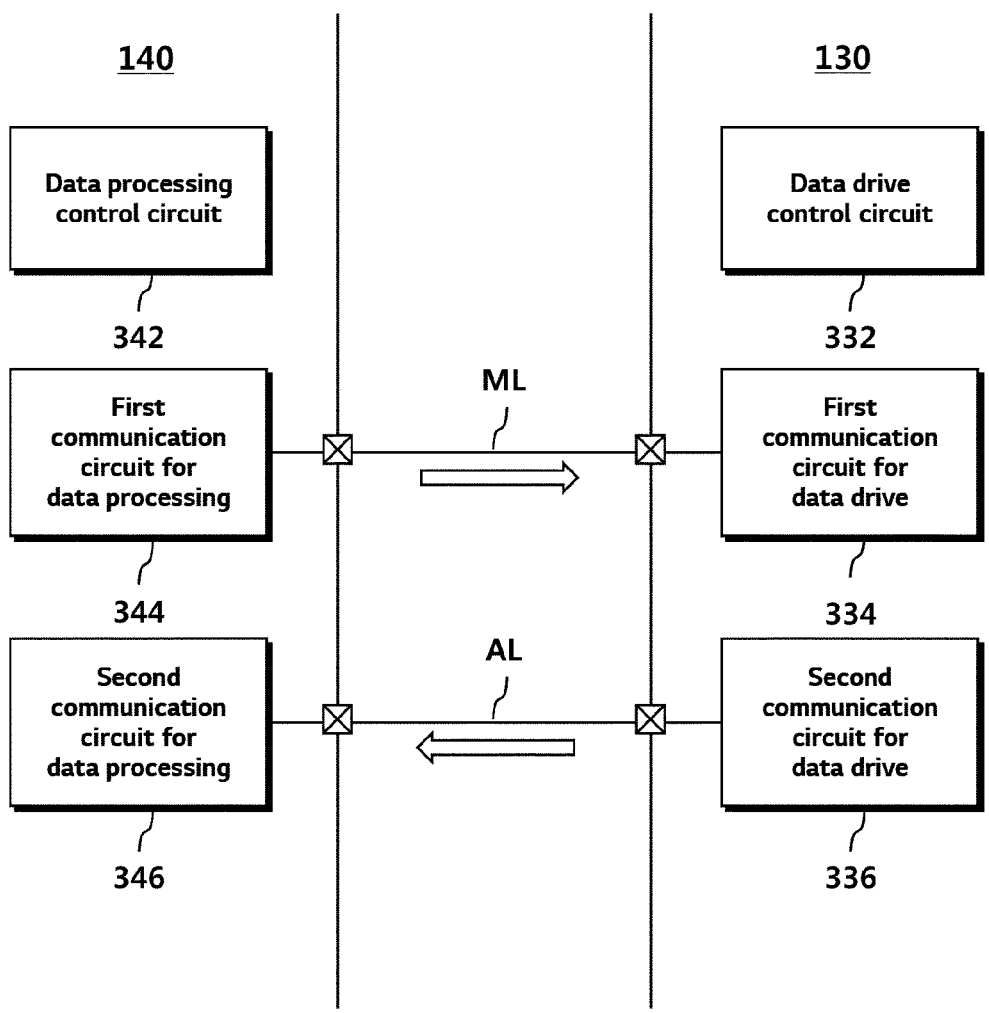
FIG. 3 illustrates the configurations of a data processing device and a data driving device according to an embodiment.

FIG. 3 illustrates the configurations of a data processing device and a data driving device according to an embodiment.

Referring to FIG. 3, a data processing device 140 may include a data processing control circuit 342, a first communication circuit for data processing 344, a second communication circuit for data processing 346, etc.

The data driving device 130 may include a data drive control circuit 332, a first communication circuit for data drive 334, a second communication circuit for data drive 336, etc.

The first communication circuit for data processing 344 may be connected to the first communication circuit for data drive 334 through a main line (ML). The first communication circuit for data processing 344 may transmit configuration value data, error detection information, a clock pattern, image data, etc. to the first communication circuit for data drive 334 through the main line (ML). Herein, the configuration value data and the error detection information may be transmitted through low-speed communication, and the clock pattern, the image data, and error detection information transmitted during transmission of the image data may be transmitted through high-speed communication.

The second communication circuit for data processing 346 may be connected to the second communication circuit for data drive 336 through an auxiliary line (AL). The second communication circuit for data drive 336 may transmit a first state signal or a second state signal to the second communication circuit for data processing 346 through the auxiliary line (AL).

Figure 8A:
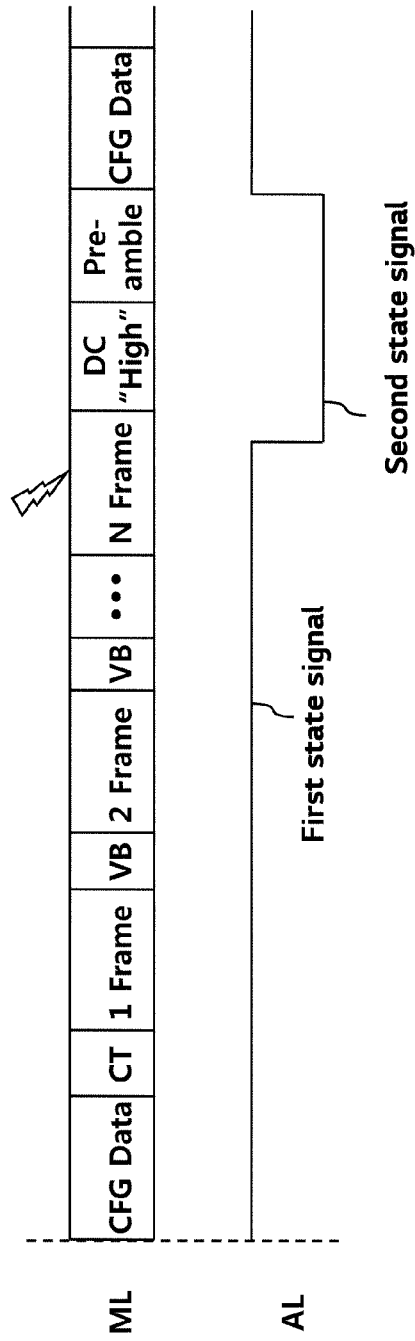
FIGS. 8A and 8B illustrate a data transmission/reception sequence of a main line or an auxiliary line according to an embodiment.
Figure 8B:
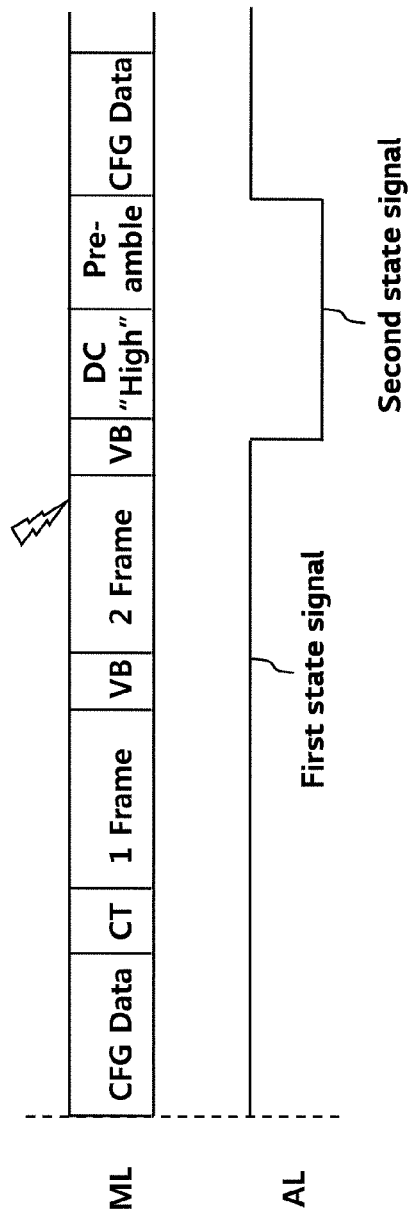

FIGS. 8A and 8B illustrate a data transmission/reception sequence of a main line or an auxiliary line according to an embodiment.

When a driving voltage (VCC) is supplied to the data driving device 130 and the data processing device 140, the data processing device 140 may transmit configuration value data and error detection information to the data driving device 130 through a main line (ML) in a CFG Data interval.

The data driving device 130 may configure a high-speed communication environment by using the configuration value data, and may store the error detection information.

Subsequently, in a CT interval, the data driving device 130 may receive a clock pattern from the data processing device 140, and may perform clock training for high-speed communication. Herein, the data driving device 130 may maintain the voltage of a signal formed in an auxiliary line (AL) at a first state signal level—for example, a high voltage level. In other words, the data driving device 130 may continuously transmit a first state signal, which has been transmitted to the data processing device 140 through the auxiliary line (AL) when clock training for low-speed communication has been completed before the CFG Data interval, until after the clock training for the high-speed communication.

After the clock training for the high-speed communication is completed, the data processing device 140 may transmit image data of a frame unit to the data driving device 130 through the main line (ML).

In an embodiment, in the case in which error detection information is transmitted and received in each horizontal blank interval (HB), when an error occurs in a high-speed communication environment of the data driving device 130 due to static electricity at the time of transmission and reception of image data of an Nth frame, the data driving device 130 may quickly determine that the error has occurred in the high-speed communication environment in a time interval, immediately after a time point at which the static electricity has occurred, among multiple time intervals of the Nth frame. As illustrated in FIG. 8A, the first state signal may be changed to a second state signal.

In an embodiment, in the case in which error detection information is transmitted and received in a vertical blank interval (VB), when an error occurs in a high-speed communication environment of the data driving device 130 due to static electricity at the time of transmission and reception of image data of a second frame, the data driving device 130 may quickly determine that the error has occurred in the high-speed communication environment in a vertical blank interval (VB) following the second frame. As illustrated in FIG. 8B, the first state signal may be changed to a second state signal. Subsequently, the data driving device 130 may newly receive configuration value data from the data processing device 140 to reconfigure the high-speed communication environment.

Herein, after transmitting a reset signal maintaining a high voltage level (high level) to the data driving device 130 for a predetermined time (e.g., the DC "High" interval in FIG. 8), the data processing device 140 may transmit a clock pattern for low-speed communication in a Preamble interval, and may transmit the configuration value data in a CFG Data interval.

Hereinafter, a description will be made of the process of transmitting and receiving data in a data driving device and a data processing device.

Figure 9:
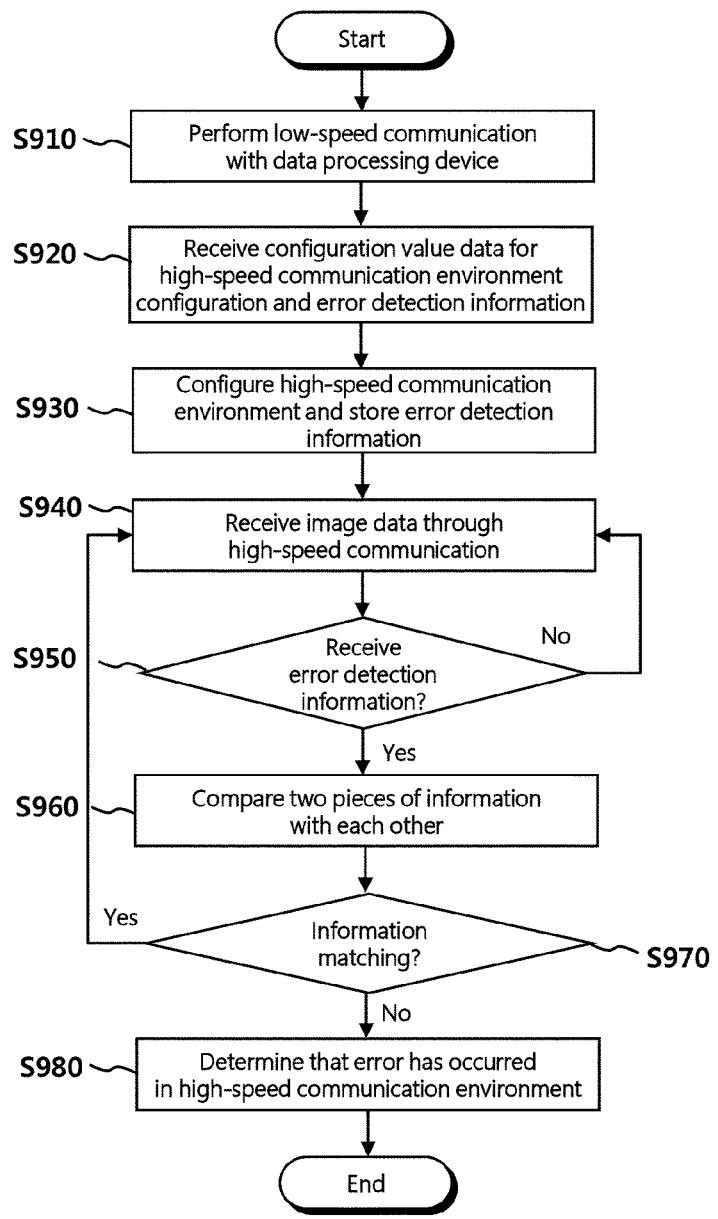
FIG. 9 is a flowchart illustrating the process of transmitting and receiving data in a data driving device according to an embodiment.

FIG. 9 is a flowchart illustrating the process of transmitting and receiving data in a data driving device according to an embodiment.

When a driving voltage (VCC) is applied to the data driving device 130 and the data processing device 140, the data driving device 130 may perform low-speed communication with the data processing device 140 in order to configure a high-speed communication environment which is a communication environment for high-speed communication with the data processing device 140 (S910).

The data driving device 130 may receive configuration value data about the high-speed communication environment and error detection information of the configuration value data from the data processing device 140 through low-speed communication (S920). Herein, the error detection information may include a checksum of the configuration value data, and the configuration value data may include the frequency bandwidth of high-speed communication, a gain level of an equalizer included in the data driving device 130, etc.

After operation S920, the data driving device 130 may configure the high-speed communication environment by using the configuration value data and may store the error detection information (S930). Herein, the data driving device 130 may store the error detection information in a memory circuit (not shown) included in the device. The memory circuit (not shown) of the data driving device 130 may include at least one of a register and random access memory (RAM).

After the high-speed communication environment is configured, the data driving device 130 may receive image data from the data processing device 140 through high-speed communication, and may process the received image data (S940).

When the data driving device 130 receives error detection information from the data processing device 140 while receiving and processing the image data, the data driving device 130 may compare the error detection information received through the high-speed communication with the error detection information pre-stored during the low-speed communication to determine that two pieces of information match each other (S950, S960).

If the error detection information received through the high-speed communication does not match the pre-stored error detection information, the data driving device 130 may determine that an error has occurred in the high-speed communication environment (S970, S980). When it is determined in operation S970 that the two pieces of information match each other, the data driving device 130 may receive image data from the data processing device 140 and may process the image data.

Until operation S980, the data driving device 130 may generate a first state signal and may transmit the first state signal to the data processing device 140 through an auxiliary line (AL). In operation S980, the data driving device 130 may generate a second state signal and may transmit the second state signal to the data processing device 140 through the auxiliary line (AL).

Thus, after operation S980, the data driving device 130 may newly receive configuration value data from the data processing device 140 to reconfigure the high-speed communication environment.

Further, operations S940 to S970 may be performed again.

The above-described process may be repeated while the driving voltage (VCC) is applied to the data driving device 130 and the data processing device 140, and when the driving voltage (VCC) is not applied, the above-described process may be ended.

Figure 10:
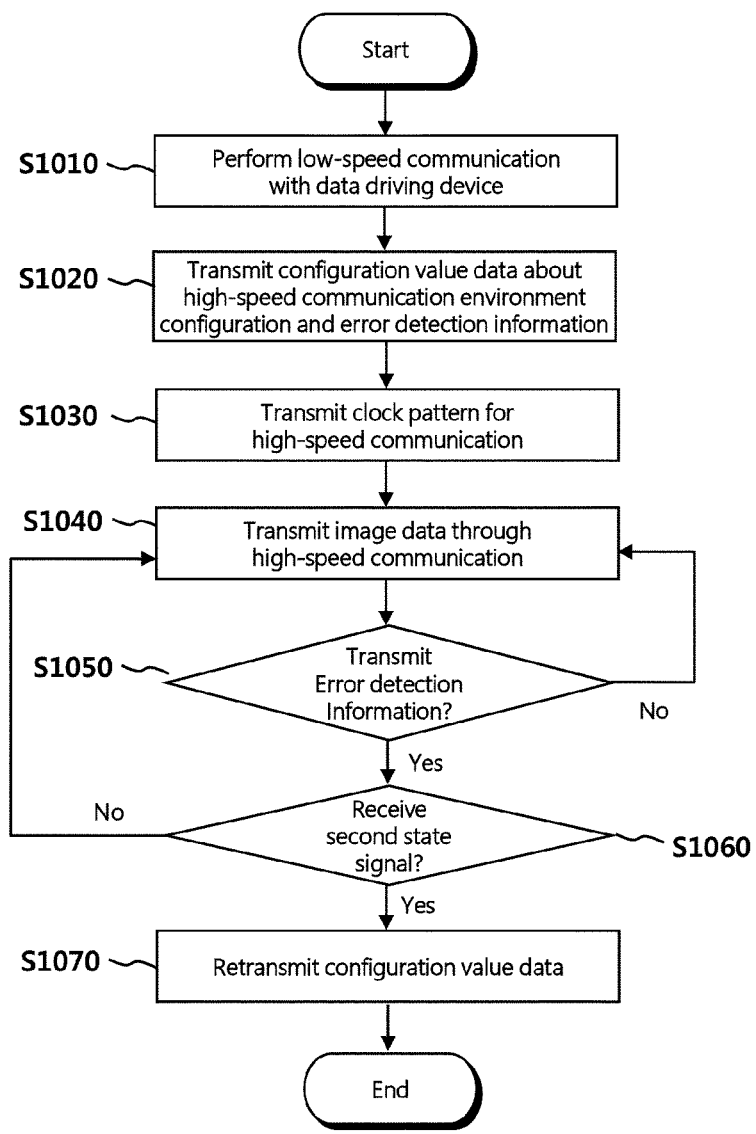
FIG. 10 is a flowchart illustrating the process of transmitting and receiving data in a data processing device according to an embodiment.

FIG. 10 is a flowchart illustrating the process of transmitting and receiving data in a data processing device according to an embodiment.

When a driving voltage (VCC) is supplied to the data driving device 130 and the data processing device 140, the data processing device 140 may perform low-speed communication with the data driving device 130 to transmit configuration value data and error detection information to the data driving device 130 (S1010, S1020). Herein, when the error detection information includes a checksum of the configuration value data, the data processing device 140 may sum, before operation S1020, all bit values of the configuration value data to generate the checksum, and may store the checksum.

After the configuration value data and the error detection information are transmitted, the data processing device 140 transmits a clock pattern for high-speed communication to the data driving device 130 such that the data driving device 130 performs clock training (S1030).

When the clock training by the data driving device 130 is completed, the data processing device 140 may transmit image data to the data driving device 130 through high-speed communication (S1040).

The data processing device 140 may transmit error detection information to the data driving device 130 while the image data is transmitted (S1050). Herein, the data processing device 140 may separately transmit the image in frame interval units, and when transmission of one frame interval is completed, may transmit error detection information in a vertical blank interval (VB) and then transmit another frame interval.

In operations S1010 to S1050, the data processing device 140 may receive a first state signal from the data driving device 130.

After operation S1050, when a second state signal is received from the data driving device 130, the data processing device 140 may retransmit the configuration value data to the data driving device 130 through low-speed communication (S1060, S1070). Herein, the data processing device 140 may also retransmit the error detection information through low-speed communication.

When it is determined in operation S1060 that the second state signal is not received, the data processing device 140 may perform operations S1040 and S1050 again.

What is claimed is:

1. A method for data transmission and reception of a data driving device in a display device, the method comprising:
    a low-speed communication operation of performing low-speed communication with a data processing device to receive configuration value data about a high-speed communication environment and error detection information regarding the configuration value data;
    a high-speed communication environment configuration operation of configuring the high-speed communication environment by using the configuration value data and of storing the error detection information;
    an image data reception operation of receiving image data from the data processing device through a high-speed communication; and
    a determination operation of receiving the error detection information again through the high-speed communication and comparing the error detection information received through the low-speed communication with the error detection information received through the high-speed communication to determine whether an error has occurred in the preconfigured high-speed communication environment.

2. The method of claim 1, wherein, in the determination operation, when the error detection information received through the low-speed communication does not match the error detection information received through the high-speed communication, the data driving device determines that an error has occurred in the preconfigured high-speed communication environment.

3. The method of claim 1, wherein, in the determination operation, the data driving device, receiving the image data by frame, receives the error detection information again in a vertical blank interval between one frame interval and another frame interval, and compares this error detection information with the error detection information received through the low-speed communication.

4. The method of claim 1, wherein, in the determination operation, the data driving device, receiving the image data by frame, which is divided into multiple time intervals, receives the error detection information again in every time interval and compares this error detection information with the error detection information received through the low-speed communication.

5. The method of claim 4, wherein one of the multiple time intervals is divided into a configuration data interval, an image data interval, and a horizontal blank interval, and the data driving device receives the error detection information again in the horizontal blank interval.

6. The method of claim 1, further comprising, after the determination operation, an operation of performing again the low-speed communication with the data processing device to newly receive configuration value data in order to reconfigure the high-speed communication environment.

7. The method of claim 1, wherein the configuration value data comprises a frequency bandwidth of the high-speed communication and a gain level of an equalizer comprised in the data driving device.

8. The method of claim 1, wherein the error detection information comprises a checksum of the configuration value data.

9. A method for data transmission and reception of a data processing device in a display device, the method comprising:
    a low-speed communication operation of performing low-speed communication with a data driving device to transmit configuration value data about an environment of high-speed communication with the data driving device and error detection information of the configuration value data;
    a first transmission operation of transmitting image data to the data driving device through the high-speed communication when the data driving device completes a clock training for the high-speed communication; and
    a second transmission operation of transmitting the error detection information to the data driving device through the high-speed communication.

10. The method of claim 9, wherein, in the second transmission operation, the data processing device receives a first state signal from the data driving device.

11. The method of claim 10, further comprising, after the second transmission operation, an operation of retransmitting configuration value data to the data driving device through the low-speed communication when a second state signal different from the first state signal is received from the data driving device.

12. The method of claim 9, wherein the error detection information comprises a checksum of the configuration value data.

13. The method of claim 9, wherein, in the second transmission operation, the data processing device, transmitting the image data by frame, transmits image data for one frame, subsequently transmits the error detection information, and transmits image data for another frame.

14. The method of claim 13, wherein, when the transmission of image data for the one frame is completed, the data processing device transmits a clock pattern to the data driving device and subsequently transmits the error detection information.

15. A system for data transmission and reception of a display device, the system comprising:

a data processing device configured to transmit configuration value data about a high-speed communication environment and error detection information of the configuration value data through low-speed communication, to transmit image data through high-speed communication, and to retransmit error detection information through the high-speed communication; and a data driving device configured to receive the configuration value data and the error detection information through low-speed communication with the data processing device, to configure the high-speed communication environment by using the configuration value data, to store the error detection information, to receive the image data through high-speed communication with the data processing device, to receive the error detection information again through the high-speed communication, to compare the error detection information received through the high-speed communication with the error detection information received through the low-speed communication, and, when the error detection information received through the high-speed communication does not match the error detection information received through the low-speed communication, to determine that an error has occurred in the preconfigured high-speed communication environment.

16. The system of claim 15, wherein the data driving device is configured, before receiving the image data, to generate a first state signal and to transmit the first state signal to the data processing device, when it is determined that an error has occurred in the predetermined high-speed communication environment, to transmit a second state signal, which is different from the first state signal, to the data processing device, and subsequently to receive configuration value data and the error detection information again through low-speed communication with the data processing device.

17. The system of claim 16, further comprising:

a main line configured to transfer the configuration value data, the error detection information, and the image data from the data processing device to the data driving device; and an auxiliary line configured to transfer the first state signal and the second state signal from the data driving device to the data processing device.

18. The system of claim 15, wherein the error detection information comprises a checksum of the configuration value data.

* * * * *